United States Patent
Sick et al.

(10) Patent No.: US 11,789,113 B2
(45) Date of Patent: Oct. 17, 2023

(54) OBJECT IDENTIFICATION USING RADAR DATA

(71) Applicant: ZF Friedrichshafen AG, Friedrichshafen (DE)

(72) Inventors: Benjamin Sick, Bodolz (DE); Michael Walter, Heerbrugg (CH)

(73) Assignee: ZF Friedrichshafen AG, Friedrichshafen (DE)

( * ) Notice: Subject to any disclaimer, the term of this patent is extended or adjusted under 35 U.S.C. 154(b) by 1164 days.

(21) Appl. No.: 16/299,912

(22) Filed: Mar. 12, 2019

(65) Prior Publication Data

US 2019/0279366 A1 Sep. 12, 2019

(30) Foreign Application Priority Data

Mar. 12, 2018 (DE) .......................... 102018203684.5

(51) Int. Cl.
*G06T 7/11* (2017.01)
*G01S 7/35* (2006.01)
(Continued)

(52) U.S. Cl.
CPC .............. *G01S 7/354* (2013.01); *G01S 7/414* (2013.01); *G01S 7/415* (2013.01); *G01S 7/417* (2013.01);
(Continued)

(58) Field of Classification Search
None
See application file for complete search history.

(56) References Cited

U.S. PATENT DOCUMENTS 6,163,755 A * 12/2000 Peer ...................... B61L 23/041
701/19
6,487,500 B2 * 11/2002 Lemelson ............ G07C 5/0891
340/436

FOREIGN PATENT DOCUMENTS

DE 10 2010 005 290 A1 8/2010

OTHER PUBLICATIONS

Search Report dated Nov. 22, 2018 for German Patent Application No. 10 2018 203 684.5, (12 pp.), note: pp. 1 and 2 are English language Explanations to Section C. Result of Determination Document.

(Continued)

*Primary Examiner* — Vikkram Bali
(74) *Attorney, Agent, or Firm* — Crowell & Moring LLP (57) ABSTRACT

An evaluation device for obtaining a segmentation of an environment from a radar recording of the environment, that has an input interface configured to obtain initial training data, where the initial training data comprise radar data of the radar recording and initial characteristics of objects located in the environment recorded with a radar sensor that generates the radar recordings, and where the evaluation device is configured to forward propagate an artificial neural network with the initial training data to obtain second characteristics of the objects determined with the artificial neural network in the forward propagation, and to obtain weighting factors for neural connections of the artificial neural network through backward propagation of the artificial neural network with the differences between the second characteristics and the initial characteristics, in order to obtain the segmentation of the environment through renewed forward propagation with these radar data.

3 Claims, 7 Drawing Sheets

(51) Int. Cl.
G01S 7/41 (2006.01)
G01S 13/89 (2006.01)
G01S 13/86 (2006.01)
G01S 13/931 (2020.01)
G01S 13/58 (2006.01)
G01S 13/536 (2006.01)
G06V 20/56 (2022.01)
G06F 18/214 (2023.01)
G01S 13/02 (2006.01)

(52) U.S. Cl.
CPC .......... *G01S 13/536* (2013.01); *G01S 13/584* (2013.01); *G01S 13/867* (2013.01); *G01S 13/89* (2013.01); *G01S 13/931* (2013.01); *G06F 18/214* (2023.01); *G06T 7/11* (2017.01); *G06V 20/56* (2022.01); *G01S 2013/0263* (2013.01); *G06T 2207/10044* (2013.01); *G06T 2207/20081* (2013.01); *G06T 2207/20084* (2013.01); *G06T 2207/30252* (2013.01)

(56) References Cited

OTHER PUBLICATIONS

Malmgren-Hansen, David et al., "Convolutional Neural Networks for SAR Image Segmentation," IEEE International Symposium on Signal Processing and Information Technology (ISSPIT), Dec. 7-10, 2015, Abu Dhabi, United Arab Emirates, IEEE Catalog No. CFP15SSP-POD, ISBN 978-1-5090-0482-9, (20 pp.).

Nielsen, Michael A., "Neural Networks and Deep Learning," Determination Press, 2015 (free online book), http://neuralnetworksanddeeplearning.com/.

* cited by examiner

OBJECT IDENTIFICATION USING RADAR DATA

RELATED APPLICATIONS

This application claims the benefit and priority of German Patent Application DE 10 2018 203 684.5, filed Mar. 12, 2018, which is incorporated by reference herein in its entirety.

TECHNICAL FIELD

The present disclosure relates to an evaluation device for obtaining a segmentation of a radar recording and a related method. Moreover, the present disclosure relates to a training system for obtaining a segmentation of a radar recording. The present disclosure also relates to an application system for a street vehicle for segmenting radar recordings. The present disclosure also relates to a radar sensor in a street vehicle with an application system. The present disclosure also relates to a use of an application system, a radar sensor, and a driver assistance system.

BACKGROUND

Radar systems often contain a radar sensor and an assembly of transmitting and receiving antennas. Local maxima are searched for with known radar systems in a range-Doppler map, which is obtained with pairs of transmitting and receiving antennas in the radar system. The local maxima are searched for with a false alarm rate algorithm, referred to in English as a "constant false alarm rate." The constant false alarm rate indicates the average number of false targets, e.g. from background noise. It is possible to determine with a threshold value the signal amplitude, starting at which a signal is indicated as a target. Signals with an amplitude lying below this threshold value are discarded as noise signals. The threshold value is adjusted adaptively with the constant false alarm rate based on the state of the environment.

Threshold values must be set high enough to discard recorded but undesired targets, referred to in English as clutter, such that only relevant targets are examined. Other information is also lost thereby. With 24 pairs of transmitting and receiving antennas, for example, each of which has a distance and speed resolution of 1024×512, thus more than 12 million values, usually only a few hundred maxima are selected, which are then processed. The rest are discarded.

With a false alarm rate algorithm, a majority of the information from the original range-Doppler map is not used. By way of example, none of the information regarding detailed characteristics of the maxima is used in the signal processing. Neither is information regarding the spatial distribution of the targets, nor information regarding an implicit antenna characteristic of the radar system, used. Only the signal/noise value for each maximum continues to be used. Global connections from which a global scenario can be derived are not taken into account.

Characterization of a finite number of video sequences, complete with features, e.g. vehicles, pedestrians, pathways, streets, signs, is known from video-based scenario segmentation. Characterization is also referred to as labeling. By labeling, it is possible to assign a meaning to the recorded object based on the raw pixel data obtained from the imaging system. An artificial neural network is trained with recordings labeled accordingly, to obtain object characteristics, e.g. dimensions and/or colors, as well as spatial relations of the objects to one another, e.g. that there is a street underneath the vehicle, and there are trees and signs next to the street. An artificial neural network that obtains a semantic segmentation of images in real time is disclosed in arXiv: 1704.08545.

In view of the above, an object of the present disclosure is to provide a semantic segmentation of radar recordings of an environment, in order to obtain a global scenario of these environment.

BRIEF DESCRIPTION OF THE DRAWINGS

The present disclosure shall be explained in greater detail below, based on the following figures.

FIG. 2b shows the transmitting and receiving antenna paths from FIG. 2a.

DETAILED DESCRIPTION

As stated above, one object of the present disclosure is to provide a semantic segmentation of radar recordings of an environment, in order to obtain a global scenario of this environment. Without limitation, the object may be achieved by an evaluation device for obtaining a segmentation of a radar recording of an environment, a related method for obtaining radar data, a training system for obtaining a segmentation of a radar recording of an environment, a training process for obtaining a segmentation of a radar recording of an environment, an application system for a street vehicle for segmenting radar recordings, a radar sensor for a street vehicle with an application system, and/or a use of an application system, a radar sensor, or a driver assistance system.

For example: a radar recording of an environment is segmented with the evaluation device according to the present disclosure. The evaluation device has an input interface that is configured to obtain initial training data. The initial training data comprise radar data from the radar recording and initial characterizations of the objects located in the environment recorded by a radar sensor, which generates the radar recordings. The radar data contain the respective distances of these objects to the radar sensor, and the respective angles between the objects and the radar sensor belonging to these distances. The evaluation device is configured to forward propagate an artificial neural network with the initial training data. The evaluation device is configured to obtain second characteristics of the objects determined in the forward propagation of the artificial neural network. The evaluation device is also configured to obtain weighting factors for neural connections of the artificial neural network through backward propagation of the artificial neural network with the differences between the second characteristics and initial characteristics. In this manner, the environment is segmented with a renewed forward propagation with these radar data.

The following definitions apply to the entire subject matter of the present disclosure.

An evaluation device is a device that processes input information and outputs a result based on this processing. In particular, an evaluation device is an electronic circuit, e.g. a central processing unit, or a graphics processor.

Radar is an abbreviation for "Radio Detection and Ranging" and refers to detection and location processes based on electromagnetic waves in the radio frequency range. The radio frequency range comprises frequencies below 3000 GHz, thus long-wave frequencies of 30 kHz or more, medium waves, short waves, and ultrashort waves of up to 300 MHz. A radar sensor is used with a camera sensor or a lidar sensor as an environment detection sensor in a driver assistance system.

Segmentation is a subcategory of digital image processing, and machine vision. Segmenting means the generation of related regions according to specific homogeneity criteria.

An interface is a device between at least two functional units, where an exchange of logical values, e.g. data or physical values, e.g. electric signals, takes place, in either only one direction or bidirectionally. The exchange can be analog or digital. The exchange can be wireless or hardwired. An interface can exist between software and software, hardware and hardware, and software and hardware and hardware and software.

Training data is data with which a learning mechanism, e.g. an artificial neural network, learns information. Training data can be data obtained with the vehicle during a training drive for an artificial neural network in a driver assistance system of a vehicle. Training data are also simulated data. Initial training data are target training data, i.e. positive training data, with which the learning mechanism learns real information.

Second training data are error training data, e.g. error characteristics of objects. The error characteristics each contain a correction characteristic, in order to obtain an initial characteristic from the error characteristic. Error training data are negative training data, by means of which the learning mechanism learns to respond to an error. The evaluation device is preferably configured to forward propagate the artificial neural network with second training data. The second training data are obtained via the input interface or a separate second input interface.

Initial characteristics are characteristics of an object that characterize the object. The initial characteristics are the objective, real features of an object. The initial characteristics can be determined with an optical system, e.g. a camera, and correspond to the characteristics that can be perceived with this optical system. The initial characteristics are also referred to as target characteristics. By way of example, initial characteristics are the geometric dimensions and/or colors of an object. Initial characteristics of a fire truck comprise, e.g., the length, height, and width of the vehicle, and the color red. The initial characteristics preferably also obtain information regarding a relation to a second object, e.g. an opposing arrangement and/or distance.

Second characteristics are characteristics of an object determined for this object by a mechanism. The second characteristics are also referred to as actual characteristics. An actual characteristic is the characteristic that the learning mechanism obtains after processing the target information, normally through computing, such that it is output. At the start of the training phase, the obtained actual characteristic normally differs from the input target characteristic. The difference between the actual and the target characteristics is minimized, normally according to the least squares method. After the training phase, the learning mechanism, e.g. the artificial neural network, has concluded the training phase, and is trained. The obtained actual characteristics are nearly identical to the target characteristics in a trained artificial neural network.

The initial image characteristics are preferably automatically obtained with an imaging sensor and one of the known methods for semantic image segmenting. Semantic image segmenting refers to the classification of objects in an image with classifiers. The imaging sensor preferably executes an algorithm for pattern recognition, i.e. the algorithm is a classifier. Patterns are recognized with special functions and/or transformations, which map a feature space with numerous classifications. By way of example, geometric figures are recognized by means of a Hough transformation. Advantageously, the classifier is an artificial neural network.

An artificial neural network is an algorithm that is executed on an electronic circuit, and is programed using the neural network of the human brain as a model. Functional units of an artificial neural network are artificial neurons, the output of which is given in general as a value of an activation function, evaluated via a weighted sum of the inputs plus a systematic error, the so-called bias. By testing numerous predetermined inputs with various weighting factors and/or activation functions, artificial neural networks are trained in a manner similar to that of the human brain. The training of an artificial neural network with the aid of predetermined inputs, i.e. training data, is referred to as machine learning. A portion of the machine learning is the so-called deep learning, in which a series of hierarchical layers of neurons, so-called hidden layers, are used for executing the process of machine learning. An artificial neural network with hidden layers is a deep neural network. A trained artificial neural network is distinguished by useful reactions to new information. Examples of artificial neural networks are perceptrons, and convolutional or recurrent neural networks. Connections between neurons are evaluated with weighting factors. Forward propagation means that information is supplied to the input layer of the artificial neural network, passes through the subsequent layers, and is output at the output layer. Backward propagation means that information is supplied to the output layer and output at the input layer. The errors of the respective layers are obtained by successive backward propagation of the error from the output layer to the respective preceding layer, until reaching the input layer. The errors are a function of the weighting factors. The weighting factors are modified by minimizing the errors in the training phase. As a result, when the inputs are input again, the desired output is approximated. The backward propagation is described comprehensively in Michael A. Nielsen, Neural Networks and Deep Learning, Determination Press, 2015.

A convolutional artificial neural network is preferred. With this type of network, a relatively small filter kernel is placed on a large input feature image. The activation of each neuron is computed via a discrete convolution with this filter kernel and/or maximum pooling. The local maximum is exploited with maximum pooling from a range of input feature images.

As a result, the evaluation device obtains a segmented scenario radar recording from a radar recording of an environment. A segmented scenario means that a three dimensional description of objects is obtained. The artificial neural network learns to recognize structures in the radar data belonging to the objects in the environment, and to map these structures onto the objects and form a relationship to these objects.

The evaluation device is preferably configured to obtain a virtual image of the environment from the radar recording with the artificial neural network, based on the initial characteristics and the segmentation.

The image obtained with the radar data is a virtual image of the environment, comparable to a virtual camera image. This image is not a real image from an optical system. Real objects in the environment are first indicated in the radar data as corresponding structures. The artificial neural network learns to recognize these structures in the radar data. The artificial neural network learns by means of the initial characteristic to map these structures onto objects, and form a relationship to these objects. As a result, the artificial neural network obtains a virtual image of the environment from a radar recording of the environment. The plausibility of real image from an optical system, e.g. a camera, can be confirmed with this virtual image.

Advantageously, the initial characteristics are characteristics of streets, objects located on streets, preferably trees, vehicles, people, traffic signs, and/or vehicle restraint systems, preferably crash barriers. In particular, classifications of vehicles can be recognized based on the radar data.

An example method according to the present disclosure for obtaining radar data comprises the following steps: outputting modulated transmitted signals, obtaining interference signals based on frequency modulation and distances and relative speeds of objects in relation to the radar sensor, against which the transmitted signals are reflected, wherein the interference signals are each composed of a reflected signal interfering with at least one of the transmitted signals, obtaining a distance/speed distribution for the object based on the interference signals, determining azimuth and elevation angles between interference signals that arrive at the radar sensor from a direction defined by the azimuth and elevation angles, and the radar sensor, for each value of the distance/speed distribution, and obtaining radar data in the form of a four dimensional data range containing the following dimensions: distance, relative speed, azimuth angle and elevation angle.

The transmitted signals are preferably frequency modulated.

The transmitted signals are preferably modulated with the frequency modulated continuous wave method, and are signals that are emitted in quick sequences with a rising frequency ramp. The frequency modulated continuous wave method is disclosed, e.g., in A. G. Stove, Linear FMCW radar techniques, in IEE Proceedings F-Radar and Signal Processing, vol. 139, no. 5. pp. 343-350, 1992.

Such a transmitted signal $s_{TX}(t)$ can be expressed as:

$$s_{TX}(t) = A_{TX} \sin(2\pi(f_0 t + \tfrac{1}{2}\alpha t^2) + \varphi_0).$$

The index TX stands for "transmitted." $A_{TX}$ is the amplitude of the transmitted signal $s_{TX}(t)$. $f_0$ is the initial frequency of the frequency modulation. $\alpha$ is the frequency modulation rate, referred to in English as the "chirp." $\Phi_0$ is the phase at the initial point in time t=0.

A reflected signal $s_{RX}(t)$ is a signal that is reflected by an object. Such a reflected signal $s_{RX}(t)$ can be expressed as:

$$s_{RX}(t) = A_{RX} \sin(2\pi(f_0(t-\tau) + \tfrac{1}{2}\alpha(t-\tau)^2) + \varphi_0 + \varphi_{target}).$$

The index RX stands for "reflected." $A_{RX}$ is the amplitude of the reflected signal $s_{RX}(t)$. $\Phi_{target}$ is a phase shift caused by a target. $\tau$ is the time of flight for the reflected signal, which, due to the Doppler shift, results in:

$$\tau(t) = \frac{2}{c_0}(r + vt)$$

$c_0$ is the speed of light. r is the distance of the object to the radar sensor. v is the relative speed of the object to the radar sensor.

The interference signal $s_{IF}(t)$ comprising the transmitted signal $s_{TX}(t)$ and the reflected signal $s_{RX}(t)$ can be expressed as follows, disregarding $\Phi_{target}$:

$$s_{IF}(t) = A_{IF} \cos(2\pi(f_0\tau + \alpha t\tau - \tfrac{1}{2}\alpha\tau^2)).$$

The index IF stands for intermediate frequency. $A_{IF}$ is the amplitude of the interference signal $s_{IF}(t)$. Using the relation for the flight of time t of the reflected signal $s_{RX}(t)$ and assuming that the relative speed v is much lower than the speed of light $c_0$, the frequency $f_{IF}$ of the interference signal can be expressed as:

$$f_{IF}(t) = 2\alpha\frac{r}{c_0} + 2f_0\frac{v}{c_0} + 2\alpha t\frac{v}{c_0}.$$

The frequency $f_{IF}$ of the interference signal $s_{IF}(t)$ is thus a function of the distance r to the object, its relative speed v to the radar sensor, and the frequency modulation rate $\alpha$.

A distance/speed distribution is thus obtained for each pair of transmitting and receiving antennas, which is referred to in English as the "range-Doppler map."

A substantial aspect of the present disclosure is that the direction from which the interference signal arrives is determined for each value of the distance/speed distribution, i.e. for each point on the range-Doppler map from all of the transmitting/receiving antenna pairs. In contrast to known methods, not only are local maxima searched for by means of a constant false alarm rate algorithm, but also all of the information in the range-Doppler map is exploited. This results in a four dimensional data range, comprising the following dimensions: distance r, speed v, azimuth angle and elevation angle. This data range contains all of the maxima and the shapes and relations to one another thereof. It is substantial to the present disclosure that the artificial neural network learns to recognize structures in this data range, and forms a relationship to these objects by means of a training phase with objects. The artificial neural network is thus configured to translate the radar data, distance, speed, azimuth angle and elevation angle into object data.

The azimuth angle is the angle between a first reference direction of a coordinate system and the orthogonal projection of the pathway between the object and the coordinate origin in the plane spanned by the first reference direction and a second reference direction, orthogonal to the first reference direction. The azimuth angle ranges from zero to $2\pi$.

The elevation angle is the angle between the polar direction and the pathway between the object and the coordinate origin. The elevation angle ranges from 0 to $\pi$.

A complete crossing of the azimuth angle and the elevation angle results in a spherical surface with a given radius.

Angles between objects at a distance r and the radar sensor are determined with the "direction of arrival" method, based on the fact that received signals from receiving antennas of an antenna assembly exhibit a phase difference. One example of a direction of arrival algorithm is the known beamforming, in which the sum of all received signals is formed with the corresponding phase corrections for a grid comprising all of the possible angles. As a result, numerous target objects can be recognized at the same distance r to the radar sensor, and at the same speed v, but with different directions of arrival. It is already possible with a two dimensional arrangement of the receiving antennas to determine the direction of an object by evaluating the differences in running lengths and the phase shifts of the received signals, and consequently, together with the distance r, to determine the exact three dimensional position of the object.

The radar data obtained with the evaluation device according to the present disclosure are preferably the radar data obtained in accordance with the method according to the present disclosure.

The training system according to the present disclosure for obtaining a segmentation of a radar recording of an environment comprises a radar sensor with a receiving antenna assembly. The receiving antennas are configured to receive signals received from objects located in the environment that reflect transmitted signals. Furthermore, the training system has at least one imaging sensor, which is configured to obtain initial characteristics of the object based on an image segmentation of the environment. Furthermore, the training system has an evaluation device, which is configured to forward propagate an artificial neural network with radar data from interference signals comprising respective reflected signals and transmitted signals and the initial characteristics, wherein the radar data comprise the respective distances of these objects to the radar sensor, and the respective angles between the objects and the radar sensor belonging to these distances. The evaluation device is configured to obtain second characteristics of the objects determined by the artificial neural network in the forward propagation. Moreover, the evaluation device is configured to obtain weighting factors for neural connections of the artificial neural network through backward propagation of the artificial neural network with the differences between the second characteristics and the initial characteristics.

The imaging sensor is preferably a camera incorporated in a street vehicle, with which initial training data are automatically generated through semantic image segmenting while driving the street vehicle. It is also within the scope of the present disclosure to automatically generate initial training data with a lidar sensor or a stereo camera, in order to obtain three dimensional training data.

As a result, when the forward propagation with these radar data is repeated, the segmentation of the surrounding is obtained. As a result, a training system for an artificial neural network is obtained, for learning to recognize structures in radar data, and to allocate a semantic meaning of the corresponding object to these structures. The artificial neural network learns, for example, to determine the position of a vehicle and its relative movement based on distance, azimuth angle, and elevation angle, on the basis of initial imaging characteristics of a vehicle.

Advantageously, a training system is used for executing the training process.

The training process according to the present disclosure for obtaining a segmentation of a radar recording of an environment may include the following steps: obtaining initial training data, wherein the initial training data comprise radar data of the radar recording and initial characterizations of objects located in the environment recorded by a radar sensor that generates the radar recordings, wherein the radar data comprise the respective distances of these objects to the radar sensor, and the respective angles between these objects and the radar sensor belonging to these distances, forward propagation of an artificial neural network with the initial training data, obtaining second characteristics of the objects determined by the artificial neural network in the forward propagation, and obtaining weighting factors for neural connections of the artificial neural network through backward propagation of the artificial neural network with the differences between the second characteristics and the initial characteristics.

The present disclosure thus also provides a training process for an artificial neural network, for learning to recognize structures in radar data, and to allocate a semantic meaning to the corresponding objects.

A training system according to the present disclosure is preferably used for executing the training process.

The application system according to the present disclosure for a street vehicle for segmenting radar recordings has an input interface for receiving radar recordings. The application system also has an evaluation device that is configured to forward propagate an artificial neural network trained in accordance with the training process according to the present disclosure with these radar recordings, and to obtain a segmenting of these radar recordings in the forward propagation, and an output interface that is configured to output this segmentation.

Street vehicles are land vehicles, which maintain or alter their direction of travel by means of friction on a substrate that can be driven on. In particular, street vehicles are motor-driven vehicles, i.e. motor vehicles, e.g. automobiles or motorcycles.

In contrast to the training system according to the present disclosure, the application system according to the present disclosure contains a trained artificial neural network, and outputs the segmentation. The application system uses distance, speed, azimuth angle and elevation angle as the input channels, instead of color channels, which are normally red, green and blue. The application system is executed on the basis of a corresponding training, in order to predict the state of a street and the course thereof through the position of the vehicle or from local reflections on adjacent vehicle. In addition, the application system recognizes bridges, signs and crash barriers next to the roadway, taking into account the global distribution of the targets. In this manner, a global scenario is obtained with radar data.

In a preferred embodiment of the present disclosure, the application system is executed to obtain a virtual image of the environment from the radar data with the artificial neural network, based on the segmentation.

The scope of the present disclosure also contains an application method comprising the following steps: obtaining radar recordings, forward propagation of an artificial neural network, trained in accordance with the training process according to the present disclosure, with these radar recordings, obtaining a segmentation of these radar recordings in the forward propagation, and outputting this segmentation.

An application system according to the present disclosure is preferably used for executing this application method.

According to the present disclosure, a radar sensor for a street vehicle with an application system according to the present disclosure is preferred.

The present disclosure also relates to a use of an application system according to the present disclosure for a radar sensor according to the present disclosure as a driver assistance system.

This specification will now refer to the figures. In the figures, identical reference symbols indicate identical components, or components having similar functions. The respective relevant components are indicated in the respective figures.

Figure 1:
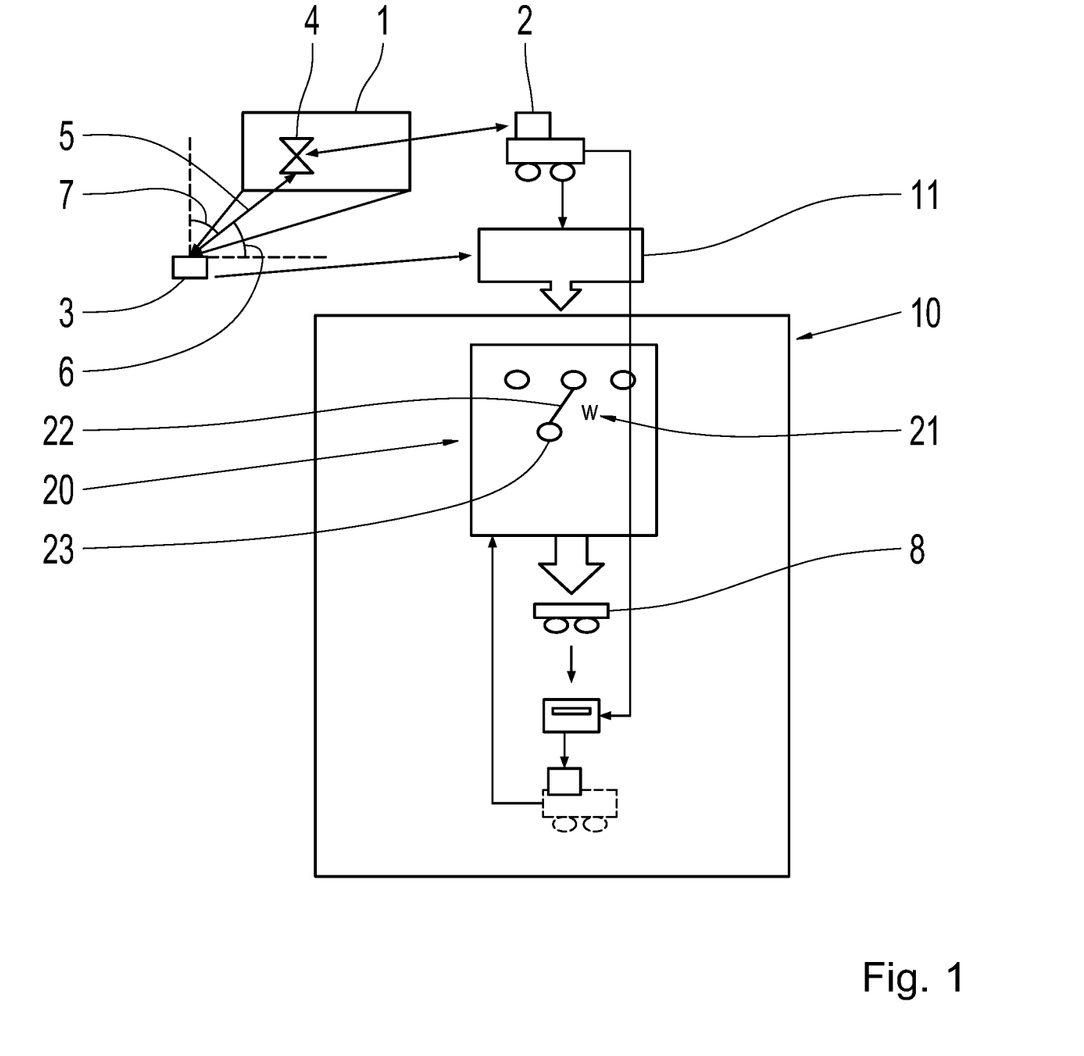
FIG. 1 shows an exemplary embodiment of an evaluation device according to the present disclosure.
Figure 2A:
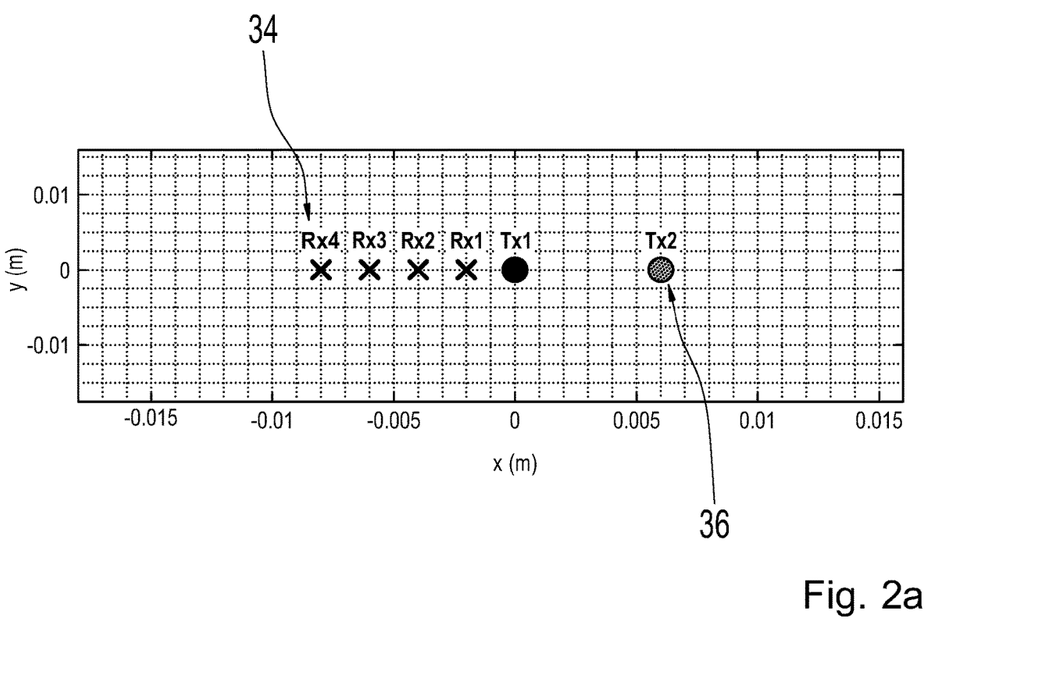
FIG. 2 shows an exemplary embodiment of an antenna assembly for a radar system with two transmitting antennas and four receiving antennas.
Figure 2B:
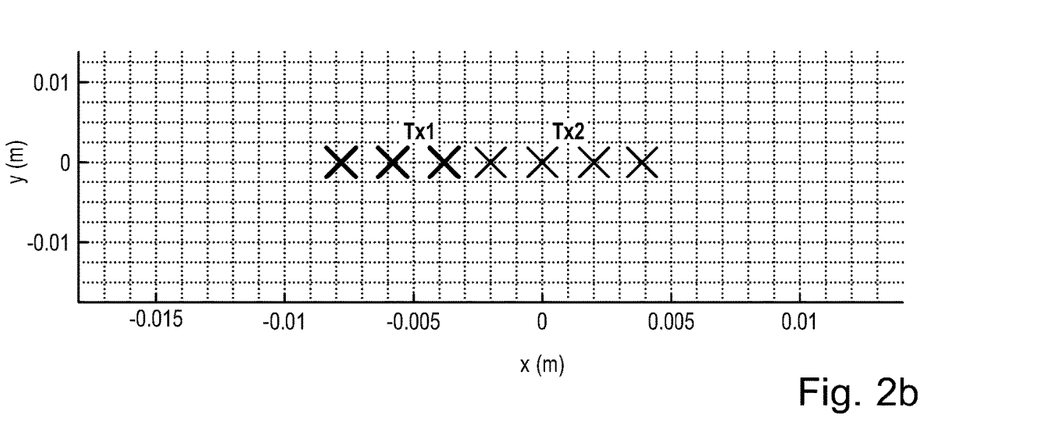

FIG. 1 shows a radar sensor 3. The radar sensor 3 is suitable for use in the automotive field, for traffic object recognition or for adaptive speed regulation, in particular as an environment detection sensor of a driver assistance system. The radar 3 complies with the requirements of EURO NCAP, the European New Car Assessment Program. The radar sensor is preferably based on the 77 GHz silicon-germanium technology used in the automotive field. The radar sensor 3 is part of a radar system, which includes the radar sensor 3 and a multi-dimensional assembly of transmitting antennas 36 and receiving antennas 34. FIG. 2a shows a two dimensional antenna assembly with two transmitting antennas 36 and four receiving antennas. The resulting eight transmitting/receiving antenna paths are shown in FIG. 2b.

Figure 3:
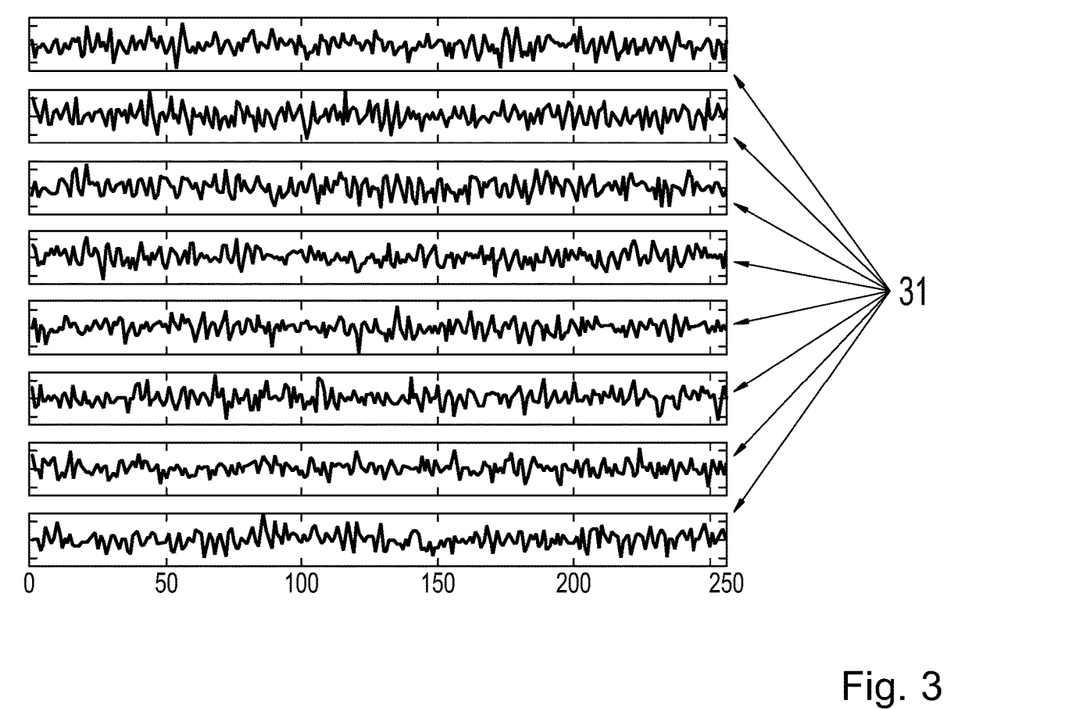
FIG. 3 shows an exemplary embodiment of the interference signals obtained in the paths in FIG. 2b.
Figure 9:
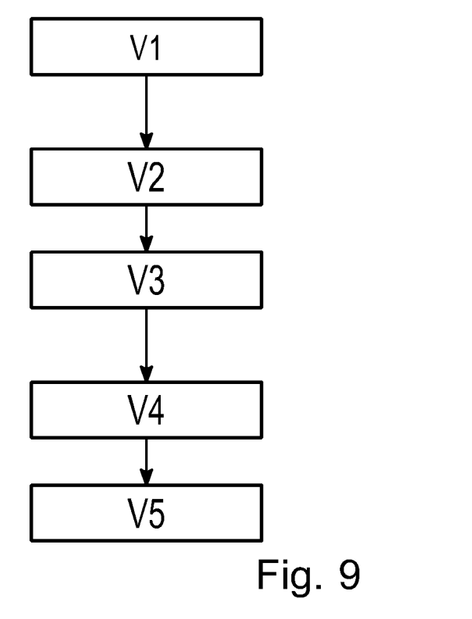
FIG. 9 shows a schematic illustration of the method according to the present disclosure.

The radar sensor 3 records radar data of an environment 1. FIG. 9 shows a method for obtaining radar data. The radar data include, in particular, a distance 5 to an object 4 in the environment 1, an azimuth angle 6, and an elevation angle 7 between the radar sensor 3 and the object 4. The azimuth angle 6 and the elevation angle 7 indicate the direction from which an interference signal 31 arrives. The interference signal 31 of the object 4 is shown in FIG. 3 for the respective transmitting/receiving antenna path, wherein FIG. 3 shows the respective temporal course for the frequencies of the interference signals 31.

The object 4 in FIG. 1 is a vehicle. Initial characteristics 2 of the vehicle are the dimensions, position and color of the vehicle. The radar data and the initial characteristics 2 are conveyed to an evaluation device 10 via an input interface 11. The evaluation device 10 is an electronic circuitry that processes input signals from numerous environment detection sensors, in particular the radar sensor 3 and an imaging sensor 50, with artificial intelligence, in real time, in order to comprehend what passes by the vehicle, in particular based on radar data. The evaluation device 10 is configured such that it remains functional when exposed to heat, moisture, dust, and other criteria in the automotive field.

The evaluation device 10 comprises an artificial neural network 20. The artificial neural network 20 is an assembly of neurons 23, which are interconnected via respective neural connections 22. The neural connections 22 are weighted with respective weighting factors 21. The artificial neural network 20 computes second characteristics 8 based on the radar data and the initial characteristics 2. A difference between the second characteristics 8 and the initial characteristics 2, obtained through subtraction, is backward propagated to the artificial neural network. The artificial neural networks 20 sets the weighting factors 21 by means of error minimization in the backward propagation. This means that the artificial neural network 20 has learned that a specific structure in the radar data corresponds to the object 4.

Figure 4:
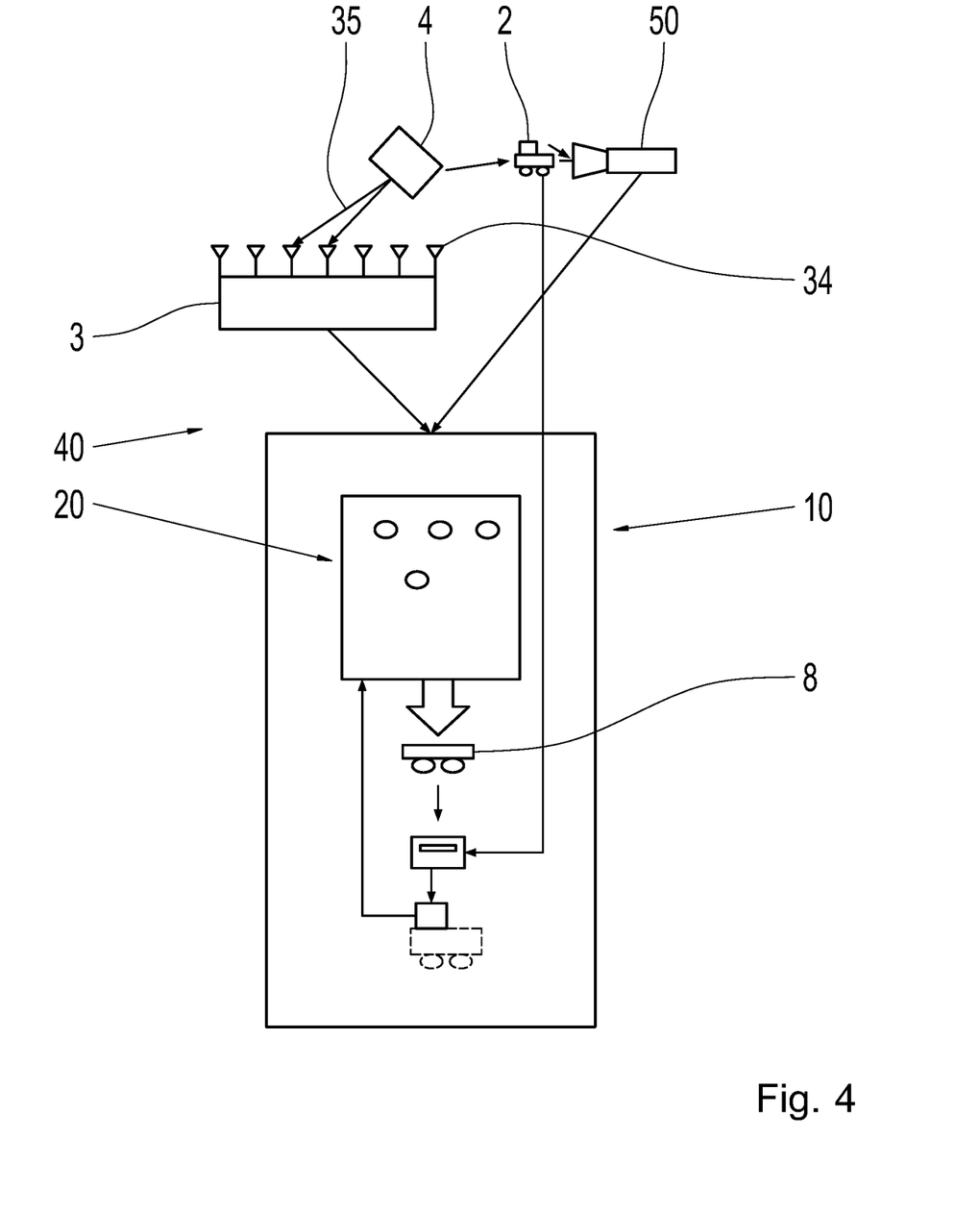
FIG. 4 shows an exemplary embodiment of a training system according to the present disclosure.
Figure 10:
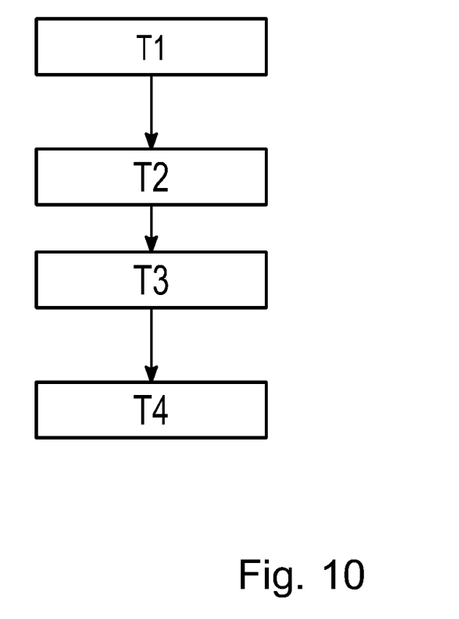
FIG. 10 shows a schematic illustration of the training process according to the present disclosure.

FIG. 4 shows a training system 40. The training system 40 contains the radar sensor 3, the imaging sensor 50 in the form of a camera, and the evaluation device 10 serving as a functionally integrated component. The radar sensor 3 contains an assembly of seven receiving antennas 34. Based on the different phases of the signals 35 received from the object 4 at the individual receiving antennas 34, the direction from which the received signal 35 arrives at the radar sensor 3, and thus the direction of the object 4 in relation to the radar sensor 3, is determined by means of beamforming. The imaging sensor 50 records the environment 1 that the radar sensor 3 records, and obtains the initial characteristics 2 of the object 4 by means of semantic image segmentation. The radar data obtained with the radar sensor 3 and the initial characteristics 2 are supplied to the evaluation device 10. The evaluation device 10 executes the artificial neural network algorithm 20. The artificial neural network 20 obtains second characteristics 8. The second characteristics 8 approximate the initial characteristics 2 in the training phase. The training process is shown in FIG. 10.

Figure 5:
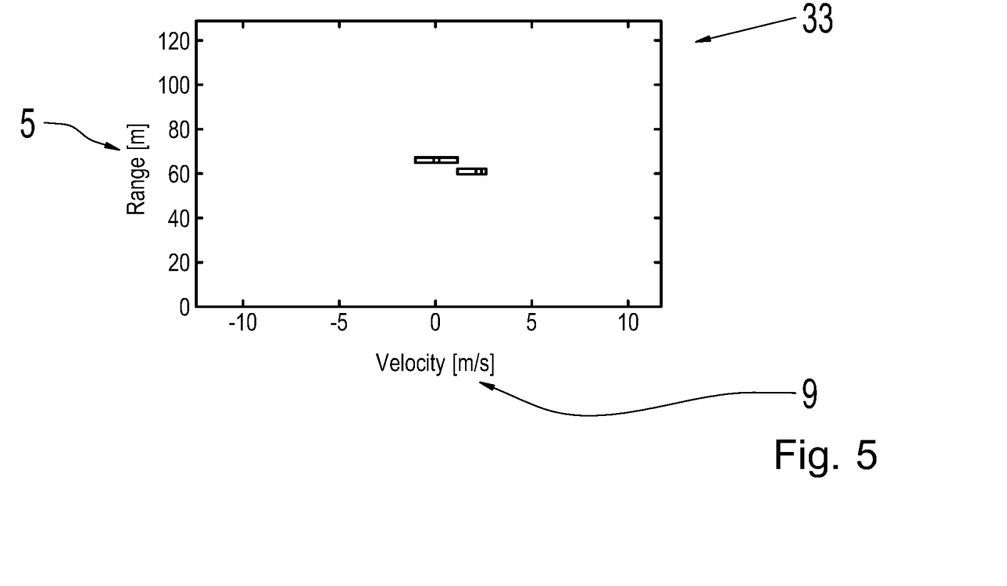
FIG. 5 shows an exemplary embodiment of a distance/speed distribution.

FIG. 5 shows a distance/speed distribution 33. The distance/speed distribution 33 is a so-called range-Doppler map, obtained from the interference signals 31. Speed 9 is plotted on the x-axis. Distance 5 is plotted on the y-axis. The distance/speed distribution 33 indicates a first maximum at a distance 5 of 65 meters to the radar sensor 3, and a speed 9 of 0 m/s in relation to the radar sensor 3. A second maximum is indicated at 60 m and 2 m/s.

Figure 6:
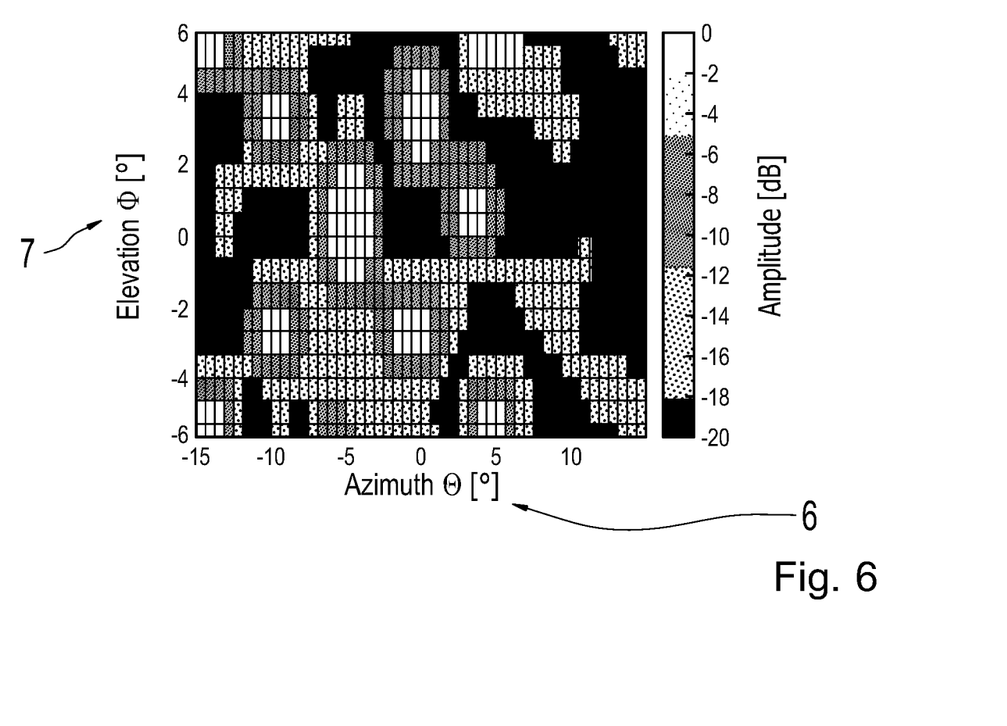
FIG. 6 shows an exemplary embodiment for beamforming.

FIG. 6 shows the results of a beamforming of the distance/speed distribution 33. The azimuth angle 6 is plotted on the x-axis. The elevation angle is plotted on the y-axis. A pronounced maximum is located in an azimuth angle range of ca. −7° to −2°, and an elevation angle range of ca. −2° to +2°.

Figure 7:
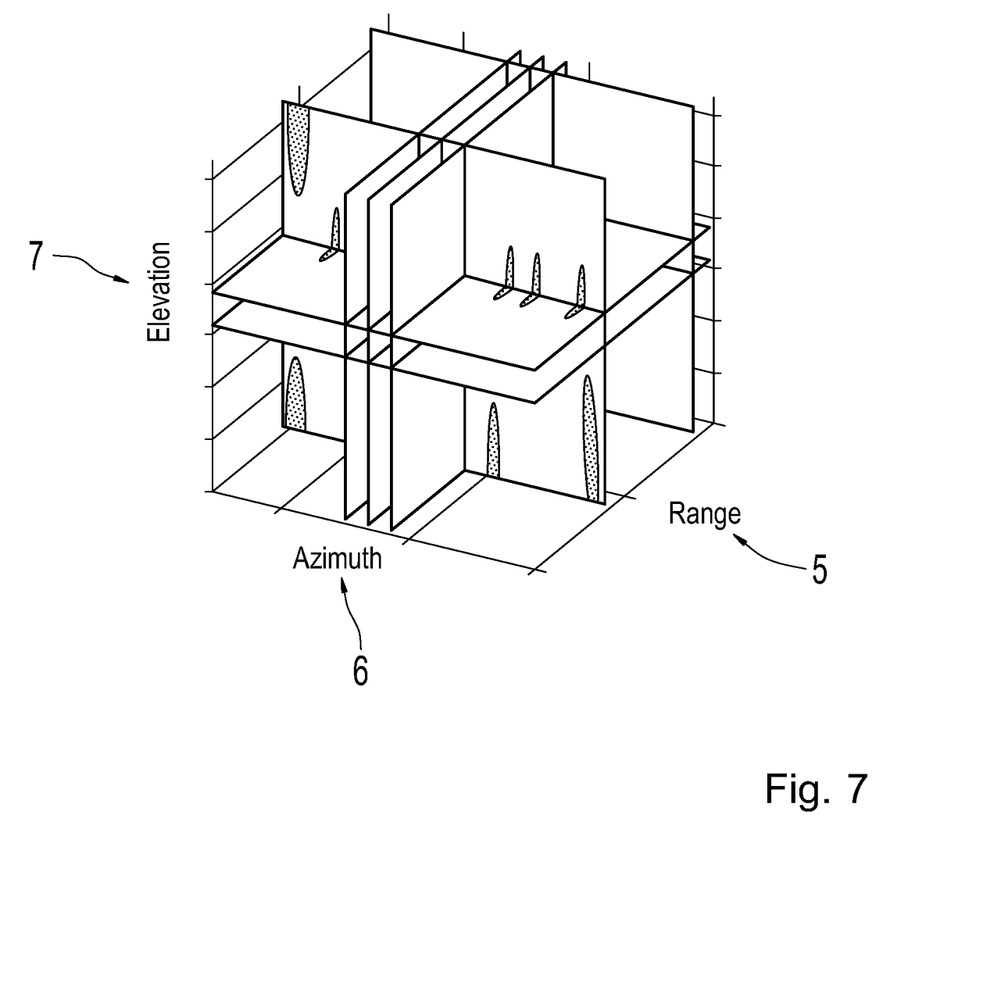
FIG. 7 shows an exemplary embodiment of a data range according to the present disclosure.

The four dimensional data range, shown in FIG. 7, containing the dimensions, distance 5, speed 9, azimuth angle 6 and elevation angle 7, is obtained with the distance 5 and the speed 9. The speed 9 dimension is not indicated in the image. Objects 4 exhibit specific structures in this data range.

Figure 8:
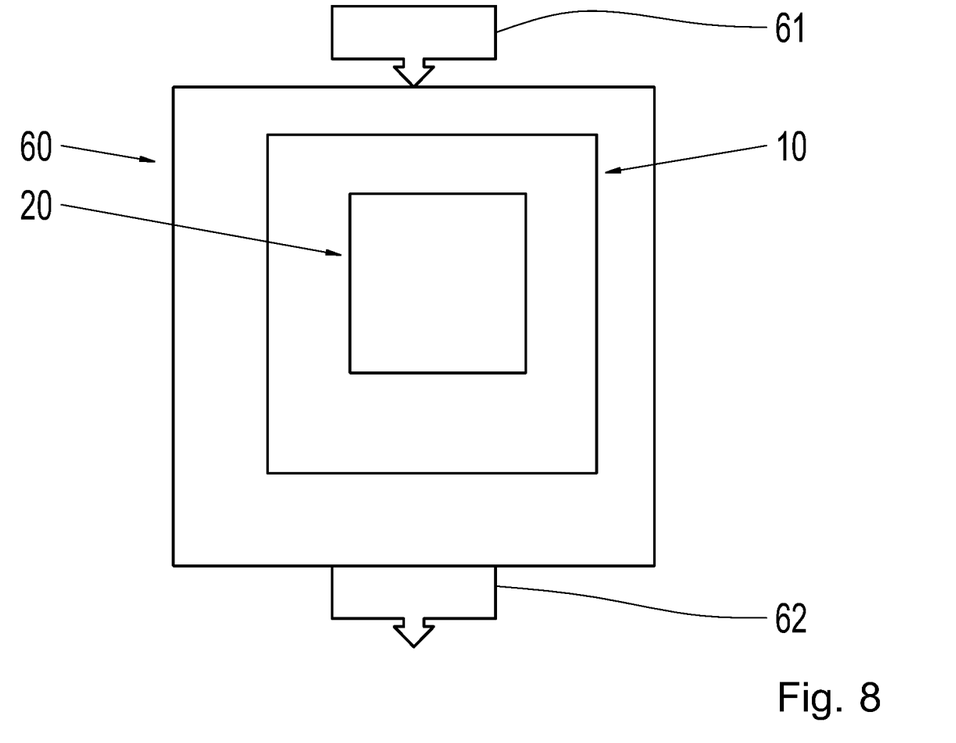
FIG. 8 shows an exemplary embodiment of an application system according to the present disclosure.

FIG. 8 shows an application system 60. The application system obtains radar data of a radar recording of the environment via an input interface 61. The evaluation device 10 executes an artificial neural network algorithm 20 that has been trained in accordance with a training process according to the present disclosure. Data inputs for the artificial neural network 20 comprise radar data. Data outputs comprise segmentation of the environment. This segmentation is obtained via an output interface 62.

The method for obtaining radar data is shown in FIG. 9. Modulated transmission signals are transmitted in step V1. The frequencies of transmission signals are modulated according to the frequency modulated continuous wave method. The interference signals 31 are received in step V2 based on frequency modulation and distances 5 and relative speeds 9 of the objects 4. The distance/speed distribution 33 of the object 4 is obtained from the interference signals 31 in step V3. Azimuth angles 6 and elevation angles 7 between interference signals 31, which arrive at the radar sensor 3 from a direction defined by the azimuth angle 6 and the elevation angle 7, and the radar sensor 3 are determined in step V4 for each value of the distance/speed distribution 33. The radar data in the form of a four dimensional data range are obtained in step V5 with the dimensions, distance 5, relative speed 9, azimuth angle 6, and elevation angle 7.

The training process for training the artificial neural network 20 is shown in FIG. 10. The initial training data are obtained in step T1. The artificial neural network 20 is forward propagated in step T2 with the initial training data. Second characteristics 8 of the object 4 that are determined with the artificial neural network 20 are obtained in the forward propagation in step T3. The weighting factors 21 for the neural connections 22 of the artificial neural network 20 are obtained in step T3 through backward propagation of the artificial neural network 20 with the differences between the second characteristics 8 and the initial characteristics 2.

REFERENCE SYMBOLS

1 environment
2 initial characteristic
3 radar sensor
4 object
5 distance
6 azimuth angle
7 elevation angle
8 second characteristic
9 relative speed
10 evaluation device
11 input interface
20 artificial neural network
21 weighting factor
22 neuron connection
23 neuron
31 interference signal
33 distance/speed distribution
34 receiving antenna
35 received signal
36 transmitting antenna
40 training system
50 imaging sensor
60 application system
61 input interface
62 output interface
V1-V5 method steps
T1-T4 method steps

We claim:

1. An evaluation device for obtaining a segmentation of a radar recording of an environment of a radar sensor, comprising:
    an input interface configured to obtain initial training data,
    wherein the initial training data comprises radar data of the radar recording and initial characteristics of objects located in the environment recorded with the radar sensor,
    wherein the radar sensor generates the radar recording,
    wherein the radar data comprises the respective distances of these objects to the radar sensor, and the respective azimuth and elevation angles between the objects and the radar sensor belonging to these distances and the speed of the objects relative to the radar sensor, and
    wherein the evaluation device is configured to forward propagate an artificial neural network with the initial training data,
    wherein the evaluation device is configured to obtain second characteristics of the objects determined with the artificial neural network in the forward propagation,
    wherein the evaluation device is configured to obtain weighting factors for neural connections of the artificial neural network through backward propagation of the artificial neural network with the differences between the second characteristics and the initial characteristics, and
    wherein the evaluation device obtains the segmentation of the environment from a renewed forward propagation with the radar data,
    wherein the evaluation device obtains a four dimensional data range containing the following dimensions of the objects: the distance of the objects, the speed of the objects, the azimuth angle of the objects, and the elevation angle of the objects relative to the radar sensor, and
    wherein the evaluation device is electrically connected to a driver assistance system of a vehicle, the driver assistance system being electrically connected to the radar sensor and configured to recognize traffic objects based on the four dimensional data range.

2. The evaluation device according to claim 1, wherein the evaluation device is configured to obtain a virtual image of the environment from the radar recording with the artificial neural network based on the initial characteristics and the segmentation.

3. The evaluation device according to claim 1, wherein the initial characteristics are characteristics of at least one of the following: at least one street, objects on or adjacent to at least one street, traffic signs, and crash barriers or other vehicle retention systems.

* * * * *